United States Patent [19]

Tao

[11] 4,233,042
[45] Nov. 11, 1980

[54] AIR-OIL SEPARATOR

[75] Inventor: Ting C. Tao, Bedford Heights, Ohio

[73] Assignee: Incom International Inc., Pittsburgh, Pa.

[21] Appl. No.: 884,051

[22] Filed: Mar. 6, 1978

[51] Int. Cl.³ .............................................. B01D 50/00
[52] U.S. Cl. ...................................... 55/482; 55/488; 55/498; 55/499; 55/DIG. 25; 55/485
[58] Field of Search ................. 55/483, 485, 486–489, 55/498, 499, 501, 510, 527, DIG. 25, 482; 210/315, 342, 493, 497, 505, DIG. 5

[56] References Cited

U.S. PATENT DOCUMENTS

| | | | |
|---|---|---|---|
| 1,807,521 | 5/1931 | Foulk | 55/482 |
| 2,701,062 | 2/1955 | Robinson | 210/493 |
| 2,911,101 | 11/1959 | Robinson | 210/315 |
| 2,959,289 | 11/1960 | Figert et al. | 210/DIG. 5 |
| 3,049,240 | 8/1962 | Smith | 210/315 |
| 3,085,381 | 4/1963 | Sobeck | 55/485 |
| 3,115,459 | 12/1963 | Giesse | 210/493 |
| 3,186,391 | 6/1965 | Kennedy | 55/510 |
| 3,209,916 | 10/1965 | May et al. | 210/315 |
| 3,262,578 | 7/1966 | Dennis | 55/487 |
| 3,450,632 | 6/1969 | Olson et al. | 210/DIG. 5 |
| 3,505,794 | 4/1970 | Nutter et al. | 55/487 |
| 3,800,945 | 4/1974 | Fowler | 210/505 |
| 4,012,211 | 3/1977 | Goetz | 55/485 |
| 4,050,237 | 9/1977 | Pall et al. | 55/486 |
| 4,124,360 | 11/1978 | Berger, Jr. et al. | 55/527 |

FOREIGN PATENT DOCUMENTS

| | | | |
|---|---|---|---|
| 233351 | 2/1959 | Australia | 55/DIG. 25 |
| 1237198 | 6/1960 | France | 55/482 |

Primary Examiner—David L. Lacey
Attorney, Agent, or Firm—James C. Wray

[57] ABSTRACT

A two-stage air-oil separator is connected to the air exhaust system of a compressor. The first stage has a pleated extended area agglomerator formed of layers of glass fiber material. The second stage has radially spaced filter elements with high loft filter material layers held between vinyl-coated glass scrims. The layers in the various filter elements are wrapped with different tightness. Fluid inlets and outlets are provided.

10 Claims, 10 Drawing Figures

AIR-OIL SEPARATOR

BACKGROUND OF THE INVENTION

This invention relates generally to liquid separators having plural distinct elements mounted concentrically. More particularly, this invention has reference to an air-oil separator having pleated agglomerator mediums.

DESCRIPTION OF THE PRIOR ART

Examples of pertinent patents are U.S. Pat. Nos.
2,720,279
3,280,985
3,290,870
3,656,627
British Pat. Nos. 818,513 and 1,272,564 and German Pat. No. 2,126,080.

U.S. Pat. No. 3,656,627 shows a composite filter assembly comprising a first stage media of annular discs and a second stage media of pleated paper disposed concentrically around the discs.

U.S. Pat. No. 3,290,870 shows a disposable air filter comprising pleated filter paper for use in automobile intake systems.

German Pat. No. 2,126,080 shows a filter made of pleated glass fiber paper mounted on a perforated inner tube. The outer layer has synthetic fibers of glass which create a compression effect.

British Pat. No. 1,272,564 shows a filter using pleated glass fiber paper. The fiber paper is two ply. A sheet of water repellant glass fiber paper is bonded to a sheet of uncured phenolic resin-impregnated glass fiber fabric.

U.S. Pat. No. 3,280,985 shows a fluid filter arrangement using pleated paper. The filter paper is a gas-pervious medium.

British Pat. No. 818,513 shows a pleated filter having a plurality of paper fibers. The filter is designed for use in an induction system of an internal combustion engine.

U.S. Pat. No. 2,720,279 shows a single medium pleated paper air filter.

U.S. Pat. No. 3,085,381 shows a two-stage oil separator having a filtering element with a plurality of layers of spirally wound filter material, crimped filters and wire screens.

Many problems remain in the prior art devices. One problem lies in the excessive pressure drop that occurs as the fluid passes through the filtering media. Another problem lies in the excessively large size required for prior art filters having an air flow capacity sufficient for use with compressors. Another problem lies in the tendency of prior art filtering media to compress under the air pressures encountered in a compressor exhaust system and thereby decrease the operating efficiency of the compressor system.

SUMMARY OF THE INVENTION

The present invention overcomes many of the problems which exist in the prior art devices. The present invention provides a two-stage air-oil separator connected to the exhaust system of an air compressor.

The first stage has a pleated extended area agglomerator formed of layered material. The pleated primary filter permits significant reduction in the size of the overall separator for a given air flow capacity. The pleated agglomerator media provides additional oil-loading surface area.

The pleated agglomerator media used in the first stage has layers of fiber glass positioned between screens. This agglomerator media, when pleated, causes little pressure drop in the air passing through the separator. In addition, this particular first stage avoids the problem of excessive compressing of agglomerator media common in prior art devices.

The second stage has radially spaced filter elements with high loft filter material layers held between vinyl coated glass scrims. Such a double second stage filter element permits further reduction in size. By wrapping the layers in the various filter elements with different tightnesses, improved filtration efficiency and effectiveness occur with a minimum pressure drop.

OBJECTS OF THE INVENTION

Objects of the invention are to provide an improved oil-air separator, to provide an oil-air separator which is highly efficient in separating oil from compressor exhaust air, to provide an oil-air separator which performs effectively in a high pressure compressor exhaust system, to provide an oil-air separator having two stages, one being an oil-air separator having a pleated extended area agglomerator, to provide an oil-air separator having a dual element second stage, to provide an oil-air separator of reduced size, and to provide an oil-air separator having little effect on the pressure of compressor exhaust air.

Another object of the invention is to provide a separator having upper and lower supports, radially spaced annular permeable casings concentrically disposed around a central axial core, annular pleated agglomerator media extending between the casings comprising relatively flat sheet agglomerator material interposed between layers of agglomerator material having relatively high loft, the casings and agglomerator media having upper and lower ends disposed in sealing relationship with the upper and lower supports respectively.

Still another object of the invention is to provide a separator having upper and lower supports, first and second filters disposed concentrically about a central axial core and extending axially between the supports for agglomerating and filtering fluids, the first filter having pleated agglomerator media with upper and lower ends disposed in sealing relationship with the upper and lower supports respectively, the second filter having radially spaced annular filter elements concentrically disposed about the core with layers of filter material having relatively high loft interposed between relatively flat sheets of permeable casing having upper and lower ends disposed in sealing relationship with the upper and lower supports respectively.

Yet another object of the invention is to provide an air oil separator adapted for use in air exhaust systems of high pressure air compressors having upper and lower supports, filters disposed concentrically about a central axial core and extending axially between the supports for separating agglomerated oil from air, agglomerators disposed concentrically about the filters and extending axially between the supports for agglomerating oil mist in air having pleated agglomerator media, intakes provided in the agglomerators for communicating oil mist-laden air from a compressor outlet to the agglomerators, outlets provided in one of the supports and communicating with the core for exhausting air from the core, and wherein the filters and agglomerators are in fluid communication for communicating fluid from the intakes to the outlets and thereby supplying air free of oil to the outlets.

These and other and further objects and features of the invention are apparent in the disclosure which includes the above and below specification and claims and drawings.

DETAILED DESCRIPTION OF THE DRAWINGS

Figure 1:
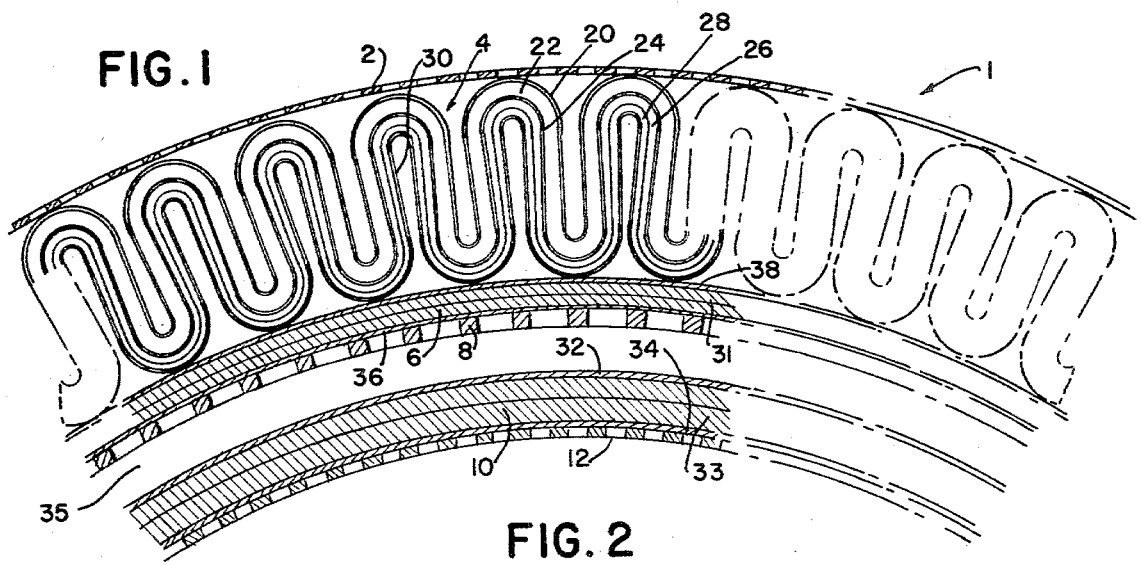
FIG. 1 is a fragmentary cross sectional view of the separator of the present invention.

Referring now to FIG. 1, the separator of the present invention is shown generally by the numeral 1. As will become apparent, the general purpose of the separator 1 is to remove oil mist from the pressurized air exhausted from a compressor outlet.

The separator 1 has two stages. The agglomerator stage 4 is positioned adjacent the outer wall 2 of the separator 1. The second stage is a double filtering stage having two filter elements 6 and 10 positioned adjacent inner walls 8 and 12 of the separator 1. Preferably, the separator walls 2, 8 and 12 are perforated steel cylinders.

The agglomerator 4 has a pleated multilayer agglomerator media. The outer layer 20 of the agglomerator media is a single layer of mesh metal screen. Similarly, the inner layer 30 is a single layer of mesh metal screen. The central layer 24 of the agglomerator media is a single layer of fiber glass sheet. Positioned between the fiber glass sheet 24 and the adjacent mesh metal screens 20 and 30 are intermediate layers 22, 26 and 28 formed of a fiber glass media. Screens 20 and 30 are made of aluminum. A single layer of fiber glass media 22 is positioned between the fiber glass sheet 24 and the outer screen 20. Two layers of fiber glass media 26 and 28 are positioned between the fiber glass sheet 24 and the inner screen 30. Preferably, the fiber glass sheet 24 has a low loft and the fiber glass media 22, 26 and 28 has a substantially higher loft. The latter may be used without the low loft sheet.

Various other agglomerator materials may be substituted without departing from the scope of the present invention. Similarly, various other layering arrangements which will be obvious to persons skilled in the art do not depart from the scope of the present invention. However, the specific agglomerator materials and layering arrangement described is preferred. This agglomerator structure proved high resistant to compressive forces exerted by the pressurized air passing through the filter. In addition, the preferred agglomerator 4 caused little pressure drop in the air passing through the filter and performed the agglomerating function, later described in greater detail, effectively.

The filter elements 6 and 10 in the second stage have two layers of filter media 31 and 33 positioned between vinyl coated glass scrims 32, 34, 36 and 38. The outer filter element 6 is held against the inner circumference of the agglomerator 4 by a perforated steel cylinder 8 concentrically spaced within the outer wall 2 of the separator 1. The inner filter element 10 is secured adjacent the inner wall 12 of the separator 1. A cylindrical space 35 is provided between the inner and outer filter elements 6 and 10.

The filter elements 6 and 10 separate oil from air in a manner more fully described later. The second stage facilitates the draining of the oil. The dual element filtering configuration used in the present invention further permits a reduction in the overall size of the separator 1 for a given air flow capacity.

Large radial forces are supported by heavy cylinder 8. Layers 31 in the outer filter element 6 are wrapped tightly around the perforated steel cylinder 8 and the layers 33 in the inner filtering element 10 are wrapped around the inner steel cylinder 12. Layers 33 are wrapped relatively less tightly than layers 31. This construction provides effective filtering capability with a minimum pressure drop in the air passing through the separator 1.

Figure 2:
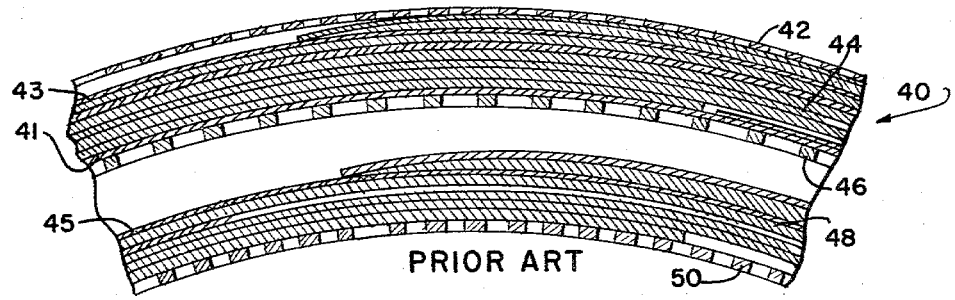
FIG. 2 is a fragmentary cross sectional view of a typical prior art separator.

The separator 40 shown in FIG. 2 is similar to those generally used in the prior art to separate oil mist from compressor exhaust air. Generally, the prior art separator has three radially spaced concentric perforated steel cylinders 42, 46 and 50. The outer filtering stage has a plurality of layers of fiber glass media 44 positioned between concentrically spaced glass scrims 41 and 43. The outer filter element is held between the outer and central steel cylinders 42 and 46. The inner filter element has a plurality of layers of fiber glass media 48 held between a vinyl coated glass scrim 45 and the inner perforated steel cylinder 50. The prior art separator 40 has less oil loading surface area than the pleated separator 1 of the present invention. Consequently, the present separator 1 can be made much smaller than the prior art separator 40 and still handle the same air flow capacity. In addition, the plurality of fiber glass media wrappings 44 and 48 in the prior art separator 40 tend to compress and compact more easily than the agglomerating and filter media in the present separator 1 when subjected to high pressure air streams. When the fiber glass media layers 44 and 48 in the prior art separator 40 are compressed, a significant pressure drop occurs. The present separator 1 avoids this problem.

FIGS. 3-10 show various embodiments of the present invention and various mounting supports used with the present invention.

Figure 3:
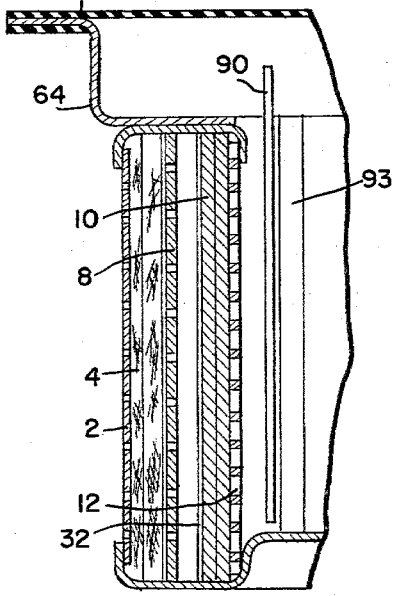
FIG. 3 is an elevational view, in section, of a portion of one embodiment of the separator of the present invention.
Figure 4:
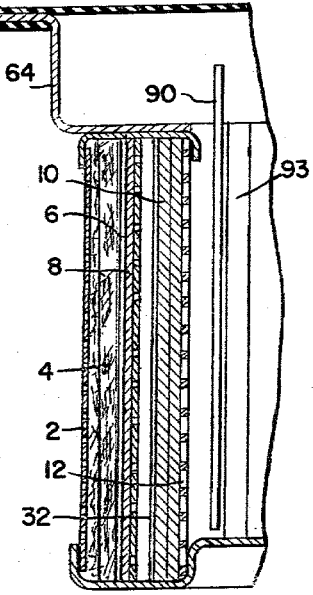
FIG. 4 is an elevational view, in section, of a portion of another embodiment of the separator of the present invention.

FIG. 3 has a single second stage 10 supported between a perforated inner wall 12 and scrim 32. FIG. 4 employs a dual second stage, filter 6 is added between pleated agglomerator 4 and perforated cylinder 8. Mounting end 64 is supplied with gaskets 84. Tube 90 withdraws oil from within the filter. Straps 93 hold the casings assembled.

Figure 5:
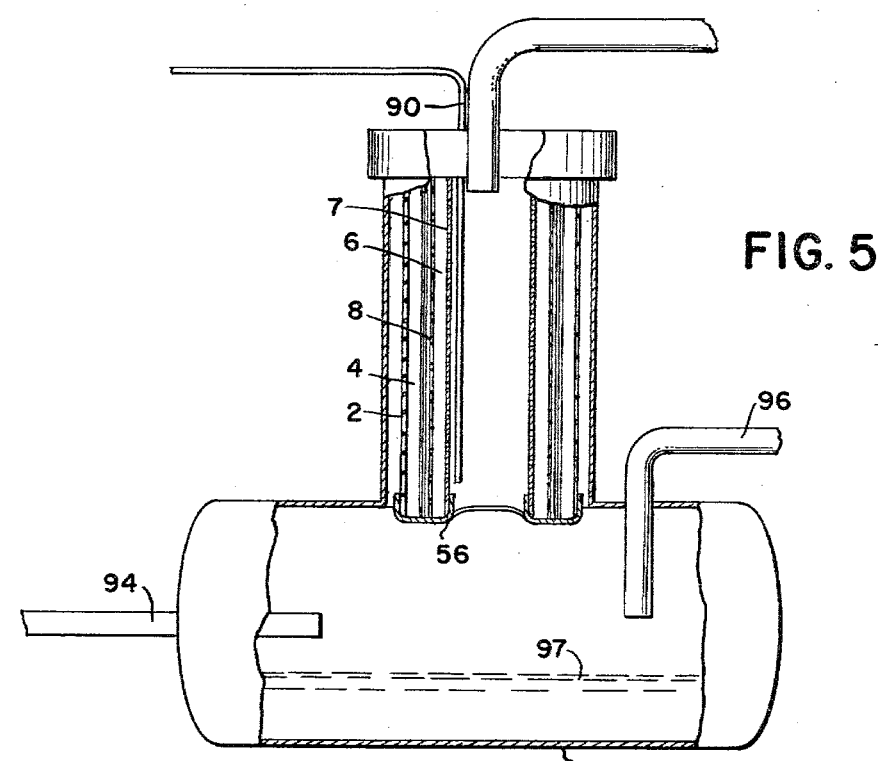
FIG. 5 is a perspective view, partly in section, of a separator installed vertically in an oil tank.

FIG. 5 shows a vertically mounted separator. An inlet port 94 formed in the side wall of a compressor oil sump 86 is connected to the pressurized air outlet (now shown) of an air compressor. Pressurized air enters the port 94 and impinges upon the separator.

Oil 97 within the tank is returned to the compressor through pipe 96 which extends to a point near the bottom of the tank.

Oil mist laden air enters the separator through agglomerator 4 of the first stage. Heavy screen 8 supports the agglomerator 4 against the pressure differential, while the oil is being agglomerated into large drops by the agglomerator 4. The air continues through second stage element 6 which is supported by a perforated cylinder 7, and oil free dry air goes out of the large pipe at the top of the separator. Some oil collects on the outer screen 2 and flows downward, collecting at the bottom of the main tank. Other oil flows through the stages of the separator and is collected at the base 56 of the separator. Oil tube 90 leads the oil from the relatively high pressure interior of the separator to the atmospheric pressure intake of the compressor.

Figure 7:
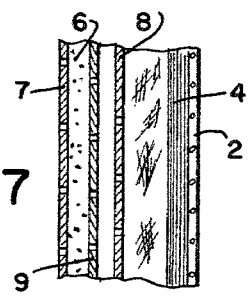
FIG. 7 is a detail of the separator embodiment shown in FIG. 6.
Figure 6:
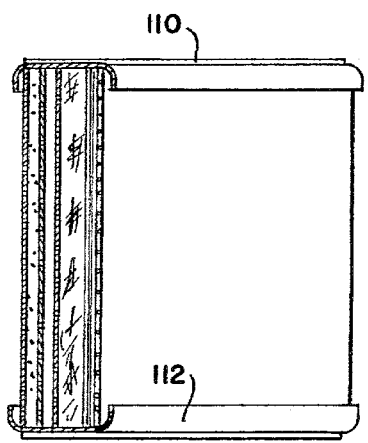
FIG. 6 is an elevational view, partially in section, showing a separator embodiment in which oil mist laden air flows from within the separator and clean air flows radially outward from the separator.

The separator shown in FIG. 6 and its detail shown in FIG. 7 flow oil mist laden air from the inside of the separator through the outside. The oil laden air flows in through an opening in one of the ends 110 or 112, and the air flows radially outward through the filter elements. Oil free dry air is collected in a circumferential shroud and is piped to a cooler or to another device or use.

The oil mist laden air impinges upon screen 2 and flows through pleated agglomerator 4. Some of the oil drips from the screen 2 and the inside of agglomerator 4 downward through the open lower end 112 into the oil sump tank. The air continues outward through the heavy perforated radial thrust cylinder 8 and through the grid 9 around which filter element 6 is wrapped.

The air continues outward through the second stage filter element 6 and through the relatively light perforated metal cylinder, grid or screen 7, wherein the oil free air is collected and used. A tube in the outer shroud similar to tube 90 collects oil which has flowed through the separator elements and returns oil to the compressor.

Figure 8:
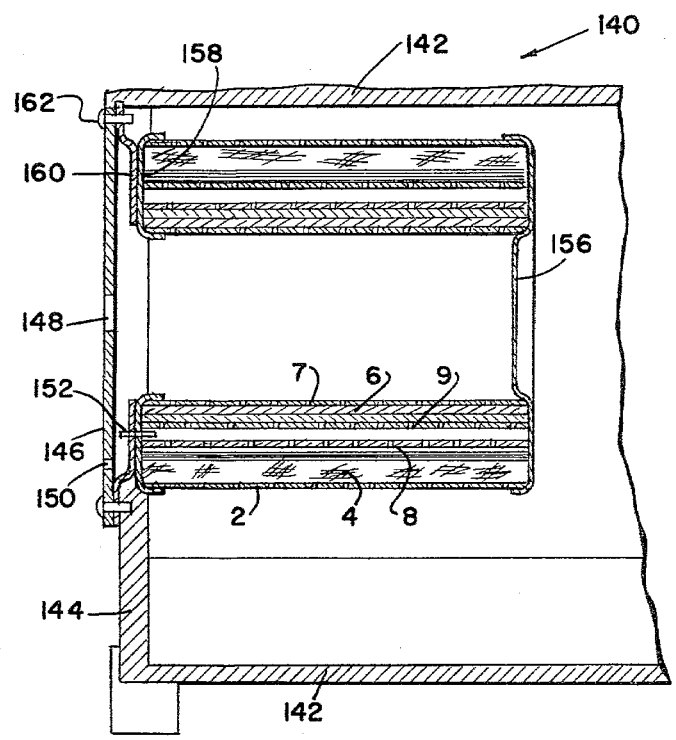
FIG. 8 shows horizontal installation of a separator with a single second stage.

A horizontal mounting of the separator unit is shown in FIG. 8. A tank 140 has a heavy cylinder 142 with a welded end plate 144. A separator unit is inserted through a large upper opening in end plate 144 and a cover plate 146 is bolted to the end plate with the gasketed filter flanges in between.

A central opening 148 in cover plate 146 flows oil free dry compressed air outward through connected piping, which is not shown. An oil opening 150 near the bottom of the plate is connected to piping which flows oil to the intake of a compressor. Oil is collected in a low spot near the cover plate and near opening 150 as it drops from short tube 152 which is inserted through end cap 158 between the first and second stages 4 and 6.

The filter elements and perforated plates and grids are held between end caps 156 and 158. Flanged cup 160 is welded to end cap 158 and extends outward between gaskets which separate the cup flange from the tank end plate 144 and the cover plate 146. Bolts 162 inserted through the cover plate 146 and the flange secure the cover plate and separator to the end plate 144 of the tank. Oil laden air flows through the outer perforated cylinder 2 and pleated multilayer agglomerator element 4. Some oil flows from perforated plate 2 and element 4 in the forms of large drops which drip into tank 140. Air and large drops of oil flow inward through heavy inward thrust sustaining perforated cylinder 8 and the air continues to flow through perforated cylinder 9, second stage element 6, and inner support plate 7. Oil is removed from between the first and second stages by short tube 152 and flows into a lower area near oil opening 150.

Figure 9:
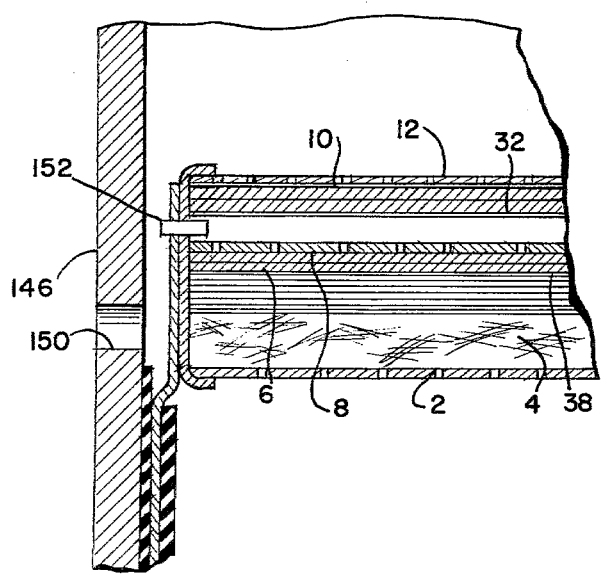
FIG. 9 shows a detail of a similarly installed separator with a double second stage.

As shown in FIG. 9, a double second stage element is mounted horizontally within the tank similar to the tank shown in FIG. 8. Oil which collects between first and second stages flows outward through a short pipe 152 and through oil opening 150 in cover plate 146. The double second stage separator shown in FIG. 9 is similar to the separator shown in FIG. 8 with the addition of second stage filter material 6 which is wrapped around an inner perforated cylinder 8. Oil migrates to the area where it is removed by short tube 152.

Figure 10:
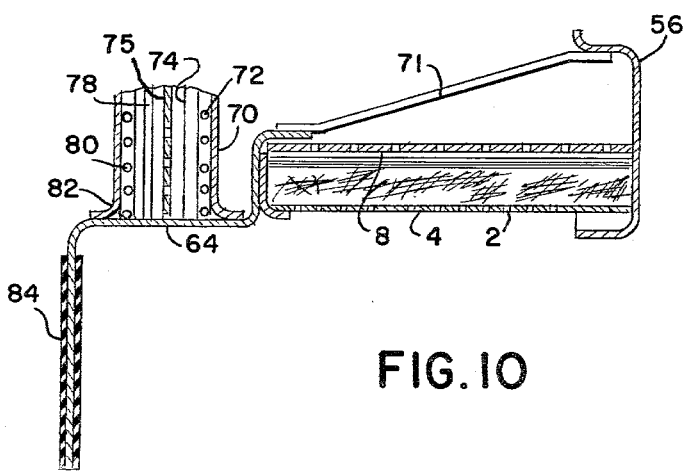
FIG. 10 shows a horizontal embodiment of a separator with second stage filter discs.

FIG. 10 shows a horizontal embodiment of the invention. Pleated agglomerator 4 is mounted on a horizontal axis. Dual secondary elements are in the form of discs 74 and 78, having compositions similar to filter elements 6 and 10 as shown in FIG. 1.

A mount 64 has welded straps 70 and 82 secured thereto to support a secondary filter disc assembly composed of inner and outer screens 72 and 80 and filter discs 74 and 78, which are separated by a foraminous metal disc 75. Flanges of the filter assembly are covered by gaskets 84 for mounting between a tank and cover. Agglomerator 4 is supported between perforated plates 2 and 8 and straps 71 connect the inward base plate 56 to the remainder of the filter assembly.

The horizontal version as shown in FIG. 10 uses secondary stage filter discs 74 and 78 instead of the second stage cylinder.

While the invention has been described with reference to specific embodiments, modifications and variations of the invention may be made without departing from the scope of the invention. The scope of the invention is described in the following claims.

What is claimed is:

1. Separator apparatus comprising;
    upper and lower supports
    radially spaced annular permeable casings concentrically disposed about a central axial core,
    first and second spaced filter means disposed concentrically about the central axial core respectively on opposite sides of one of said permeable casings and extending axially between the supports for agglomerating and filtering fluids,
    said first filter means comprising pleated agglomerator media means having upper and lower ends disposed in sealing relationship with the upper and lower supports respectively,
    said second filter means comprising radially spaced annular filter elements concentrically disposed about the core, wrapped directly adjacent on the outer radial side of one of said permeable casings, the annular filter elements comprising layers of filter material having relatively high loft having upper and lower ends disposed in sealing relationship with the upper and lower supports respectively,
    said casings, said annular filter elements and said agglomerator media means having upper and lower ends disposed in sealing relationship with the upper and lower supports respectively.

2. The apparatus of claim 1 wherein the agglomerator media means comprises a sheet agglomerator material interposed between a single layer of high loft agglomerator material and two superposed layers of high loft agglomerator material, said single layer disposed on a radially outward surface of the sheet agglomerator material.

3. The apparatus of claim 1 wherein
the high loft filter material comprises synthetic material.

4. The apparatus of claim 1 wherein
the permeable casings comprise vinyl coated glass scrims.

5. The apparatus of claim 1 further comprising
filter intake means provided radially outward of the first filter means for supplying fluid to the first filter means,
the second filter means is positioned radially inwardly of the first filter means and is in fluid communication with the first filter means,
filter outlet means provided in one of the support means and communicating with the core for exhausting fluid from the core.

6. The apparatus of claim 1 further comprising
intake means provided surrounding the agglomerator media means for communicating oil mist laden air from a compressor outlet to the agglomerator means,
outlet means provided in one of the supports and communicating with the core for exhausting air from the core, and wherein
the second filter means and agglomerator media means are in fluid communication for communicating fluid from the intake means to the outlet means and thereby supplying air free of oil to the outlet means.

7. Separator apparatus comprising;
upper and lower supports
radially spaced annular permeable casings concentrically disposed about a central axial core,
filter means disposed concentrically about the central axial core, the filter means comprising;
first and second radially spaced annular filter elements, and annular pleated agglomerator media means, the agglomerator media means comprising a flat sheet agglomerator material interposed between a single layer of high loft agglomerator material and two superposed layers of high loft agglomerator material, said single layer received on a surface of the flat sheet agglomerator material, which surface faces radially outward from the core, and the agglomerator media means comprises sequentially from an outermost radial side thereof to an innermost radial side a first mesh screen outwardly adjacent to the single layer of high loft agglomerator material, which is outwardly adjacent to the flat sheet agglomerator material, which in turn is outwardly adjacent to the two superposed layers of agglomerator material, which are outwardly adjacent to a second mesh screen,
the annular pleated agglomerator means being disposed radially inward of and adjacent to an outer one of the permeable casings and being disposed outward of an inner one of the permeable casings,
the annular pleated agglomerator media extending between said upper and lower supports.

8. The apparatus of claim 7 wherein
said sheet agglomerator material and said high loft agglomerator material comprise glass fibers.

9. The apparatus of claim 7 wherein
the mesh screens comprise mesh aluminum screens.

10. The apparatus of claim 7 wherein
the radially outermost of said filter elements includes layers of filter material which are wrapped about the outermost disposed permeable casing on the outer radial side of said casing,
the radially innermost of said filter elements includes layers of filter material which are wrapped about the innermost disposed permeable casing on the outer radial side of said casing,
and the layers of filter material of the radially innermost filter element are wrapped relatively less tightly than the layers of filter material of the radially outermost filter element.

* * * * *